UNITED STATES PATENT OFFICE.

OSCAR HINSBERG, OF GENEVA, SWITZERLAND, ASSIGNOR TO THE FARBWERKE, VORMALS MEISTER, LUCIUS & BRÜNING, OF HÖCHST-ON-THE-MAIN, GERMANY.

ESTER OF ALKOYLAMIDOPHENOLS AND METHOD OF MAKING SAME.

SPECIFICATION forming part of Letters Patent No. 569,416, dated October 13, 1896.

Application filed October 31, 1895. Serial No. 567,501. (Specimens.)

*To all whom it may concern:*

Be it known that I, OSCAR HINSBERG, doctor of philosophy, a citizen of the German Empire, residing at Geneva, Switzerland, have invented certain new and useful Improvements in Methods of Manufacturing Carbonic Esters of Alkoylamidophenols and of Their Alkylated Derivatives, of which the following is a specification.

This invention relates to an improved process of producing carbonic esters of alkoylamidophenols and their derivatives, to be used for medicinal purposes.

I have discovered that alkoylparaamidophenols and their derivatives, in which the nitrogen atom is alkylated, may be converted in the form of their salts into alkoylamidophenol carbonic esters or alkoylalkylamidophenol carbonic esters of the general formula:

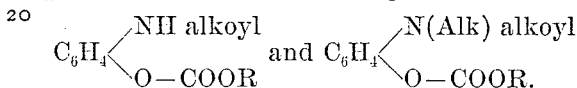

I have prepared the following new compounds by means of the above method: acetylethylamidophenyl-ethyl carbonate, melting-point 95° to 96°; acetylethylamidophenyl-methyl carbonate, melting-point 83° to 84°; acetylmethylamidophenyl-ethyl carbonate, melting-point 103° to 104°; acetylmethylamidophenyl-methyl carbonate, melting-point 145° to 146°; acetylamidophenyl-ethyl carbonate, melting-point 121°; acetylamidophenyl-methyl carbonate, melting-point 115° to 116°; acetylamidophenyl-isobutyl carbonate, melting-point 116° to 117°; acetylamidophenyl-isoamyl carbonate, melting-point 112° to 113°; lactylamidophenyl-ethyl carbonate, melting-point 101° to 102°; phenylglycolylamidophenyl-ethyl carbonate, melting-point 162.5°; lactylamidophenyl-methyl carbonate, melting-point 87° to 88°; formylamidophenyl-ethyl carbonate, melting-point 84° to 85°; formylamidophenyl-methyl carbonate, melting-point 104° to 105°.

I illustrate the above method by the following example: 1.89 kilograms of acetylethylamidophenol are dissolved in the calculated quantity of soda-lye and the solution treated with a slight excess of about 1.1 kilograms of ethylchlor carbonate and shaken until the reaction is over, precautions being taken to prevent any considerable rise of temperature. The precipitate of acetylethylpara-amidophenyl-ethyl carbonate thus formed is crystallized from dilute alcohol.

The alkoylamidophenyl carbonic esters are colorless compounds which crystallize well, are difficultly soluble in cold water, easily soluble in alcohol and hot water, less soluble in benzene and ether. They are decomposed by heating with acids or alkalies. Their melting-points are between 80° to 161° centigrade. The new products are used as a remedy for fevers and are administered in doses from 0.5 to one gram.

Having thus described my invention, I claim as new and desire to secure by Letters Patent—

1. The process herein described of producing carbonic esters of alkoylamidophenols and of their derivatives, which consists in treating alkoylamidophenols and their derivatives, the nitrogen atom of which is alkylated, in the form of their salts with esters of chlorcarbonic acid, substantially as set forth.

2. As a new article of manufacture carbonic esters of alkoylamidophenol, being colorless compounds having melting-points between 80° and 161° centigrade, crystallizing well, difficultly soluble in cold water but easily soluble in hot water or alcohol, less soluble in ether and benzene and possessing the general formula

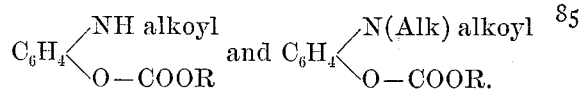

In testimony that I claim the foregoing as my invention I have signed my name in presence of two subscribing witnesses.

OSCAR HINSBERG.

Witnesses:
BENJ. H. RIDGELY,
OTTO MAY.